United States Patent
Sasaki et al.

(10) Patent No.: US 12,480,068 B2
(45) Date of Patent: Nov. 25, 2025

(54) GREASE COMPOSITION AND RACK-AND-PINION-TYPE STEERING DEVICE FILLED WITH THE SAME GREASE COMPOSITION

(71) Applicants: KYODO YUSHI CO., LTD., Fujisawa (JP); OILES CORPORATION, Fujisawa (JP)

(72) Inventors: Kota Sasaki, Fujisawa (JP); Daisuke Tsutsui, Yokohama (JP); Shuichi Yamaguchi, Fujisawa (JP)

(73) Assignees: KYODO YUSHI CO., LTD., Fujisawa (JP); OILES CORPORATION., Fujisawa (JP)

( * ) Notice: Subject to any disclaimer, the term of this patent is extended or adjusted under 35 U.S.C. 154(b) by 0 days.

(21) Appl. No.: 18/846,995

(22) PCT Filed: Mar. 28, 2023

(86) PCT No.: PCT/JP2023/012509
§ 371 (c)(1),
(2) Date: Sep. 13, 2024

(87) PCT Pub. No.: WO2023/190513
PCT Pub. Date: Oct. 5, 2023

(65) Prior Publication Data
US 2025/0197759 A1   Jun. 19, 2025

(30) Foreign Application Priority Data
Mar. 28, 2022 (JP) ................................. 2022-052030

(51) Int. Cl.
| | | |
|---|---|---|
| *C10M 169/00* | (2006.01) | |
| *B62D 3/12* | (2006.01) | |
| *C10M 107/02* | (2006.01) | |
| *C10M 115/08* | (2006.01) | |
| *C10M 135/10* | (2006.01) | |
| *C10M 135/18* | (2006.01) | |
| *C10M 159/06* | (2006.01) | |
| *C10M 163/00* | (2006.01) | |
| *F16H 57/04* | (2010.01) | |
| *C10N 20/02* | (2006.01) | |
| *C10N 30/06* | (2006.01) | |
| *C10N 50/10* | (2006.01) | |

(52) U.S. Cl.
CPC ........... *C10M 169/00* (2013.01); *B62D 3/123* (2013.01); *C10M 107/02* (2013.01); *C10M 115/08* (2013.01); *C10M 135/10* (2013.01); *C10M 135/18* (2013.01); *C10M 159/06* (2013.01); *C10M 163/00* (2013.01); *F16H 57/0464* (2013.01); *C10M 2203/10* (2013.01); *C10M 2205/0206* (2013.01); *C10M 2215/1026* (2013.01); *C10M 2219/044* (2013.01); *C10M 2219/068* (2013.01); *C10N 2020/02* (2013.01); *C10N 2030/06* (2013.01); *C10N 2050/10* (2013.01); *F16H 57/0495* (2013.01)

(58) Field of Classification Search
CPC . F16H 57/0464; F16H 57/0495; B62D 3/123; C10N 2020/02; C10N 2030/06; C10N 2050/10; C10M 169/00; C10M 107/02; C10M 115/08; C10M 135/10; C10M 135/18; C10M 159/06; C10M 163/00; C10M 2203/10; C10M 2205/0206; C10M 2215/1026; C10M 2219/044; C10M 2219/068
See application file for complete search history.

(56) References Cited

U.S. PATENT DOCUMENTS

| | | | |
|---|---|---|---|
| 2007/0149422 A1 | 6/2007 | Miyajima et al. | |
| 2011/0168479 A1 | 7/2011 | Nakata et al. | |
| 2015/0247105 A1 | 9/2015 | Yamazaki | |
| 2017/0362530 A1 | 12/2017 | Hirooka et al. | |
| 2020/0148970 A1 | 5/2020 | Watanabe | |
| 2021/0171858 A1* | 6/2021 | Tanaka | C10M 169/06 |
| 2022/0017836 A1 | 1/2022 | Isa et al. | |

FOREIGN PATENT DOCUMENTS

| | | | |
|---|---|---|---|
| JP | 2002371290 A | 12/2002 | |
| JP | 2004269722 A | 9/2004 | |
| JP | 2004345595 A | 12/2004 | |
| JP | 2005247971 A | 9/2005 | |
| JP | 2010095631 A | 4/2010 | |

(Continued)

OTHER PUBLICATIONS

International Search Report issued Jun. 6, 2023 in International Application No. PCT/JP2023/012509.

(Continued)

*Primary Examiner* — Vishal V Vasisth
(74) *Attorney, Agent, or Firm* — Panitch Schwarze Belisario & Nadel LLP

(57) ABSTRACT

A grease composition includes a urea-based thickener; a synthetic hydrocarbon oil and/or a mineral oil as a base oil, a kinematic viscosity of the base oil at 100° C. being 4 to 40 mm²/s; and 1 to 10% by mass of a montan wax, 1 to 5% by mass of a molybdenum-based extreme pressure agent, and 1 to 5% by mass of a sulfonate-based compound as additives, and the grease composition has a consistency of 310 to 430. The grease composition is for use in lubrication between a metal member and a metal member and lubrication between a metal member and a resin member.

12 Claims, No Drawings

(56) References Cited

FOREIGN PATENT DOCUMENTS

| | | |
|---|---|---|
| JP | 2020083994 A | 6/2020 |
| WO | 2004081156 A1 | 9/2004 |
| WO | 2014054797 A1 | 4/2014 |
| WO | 2016104812 A1 | 6/2016 |
| WO | 2019151332 A1 | 8/2019 |

OTHER PUBLICATIONS

Written Opinion issued Jun. 6, 2023 in International Application No. PCT/JP2023/012509.
Extended European Search Report issued on May 23, 2025, by the European Patent Office in corresponding EP Application No. 23780522.1 (9 pages).

* cited by examiner

GREASE COMPOSITION AND RACK-AND-PINION-TYPE STEERING DEVICE FILLED WITH THE SAME GREASE COMPOSITION

CROSS-REFERENCE TO RELATED APPLICATIONS

This application is a Section 371 of International Application No. PCT/JP2023/012509, filed Mar. 28, 2023, which was published in the Japanese language on Oct. 5, 2023, under International Publication No. WO 2023/190513 A1, which claims priority under 35 U.S.C. § 119(b) to Japanese Application No. 2022-052030, filed Mar. 28, 2022, the disclosures of which are incorporated herein by reference in their entirety.

TECHNICAL FIELD

The present invention relates to a grease composition applicable for both lubrication between metal members and lubrication between a metal member and a resin member.

BACKGROUND ART

A rack and pinion gear is a type of actuator in which a circular metal gear called a pinion gear and a rod gear formed of a metal rod with cut teeth called a rack bar are meshed with each other to convert rotational motion into linear motion. In the case of an automobile, the pinion gear is attached to the tip end of the shaft extending from the steering wheel of the automobile. When the steering wheel is operated, the pinion gear rotates and the rack bar moves horizontally in a driving direction, thereby changing the directions of the wheels. In the rack and pinion gear, the gear meshing areas are lubricated with sliding, which leads to the occurrence of wear. The wear thus occurred causes generation of noise.

Meanwhile, a support yoke, which supports the rack bar so that the rack bar can slide freely in order to improve the steering performance and quietness of the rack and pinion gear, includes a spring with which the support yoke is pressed against the rack bar and is attached to the back of the rack bar. The support yoke has an eccentric center of curvature such that the support yoke can be in contact with the rack bar within a certain band-width area, and a yoke pad made of a resin material formed with a concave arc surface is used for a surface of the support yoke to slide on the rack bar. The yoke pad is lubricated with sliding on the rack bar, which leads to the occurrence of friction and wear. When friction occurs, the support yoke loses its ability to improve the steering performance. When wear occurs, the support yoke loses its ability to improve the quietness.

Heretofore, as an example of a grease composition usable for resin members, a grease composition for resin lubrication has been reported which contains a base oil, a thickener, and a montan wax, and which reduces the static friction coefficient, and extends the durability life (Patent Literature 1). As an example of a grease composition usable for metal members, a grease composition has been reported which contains a thickener, a synthetic oil, a mineral oil, MoDTC, and a Ca sulfonate, which has such extreme pressure properties that achieve endurance even under harsh conditions, and which has excellent low-temperature operability (Patent Literature 2).

CITATION LIST

Patent Literatures

Patent Literature 1: Japanese Patent Application Publication No. 2002-371290
Patent Literature 2: Japanese Patent Application Publication No. 2004-269722

SUMMARY OF INVENTION

Problems to be Solved by the Invention

As a result of conducting experiments, the present inventors have revealed that a grease composition usable for lubrication between a metal member and a resin member reduces a sliding force and an amount of wear of a support yoke, but fails to provide sufficient boundary lubrication required for the rack and pinion gear, resulting in the occurrence of gear wear and abnormal noise generated from the rack bar. Meanwhile, the present inventors have revealed that a grease composition usable between metal members does not achieve reductions in the sliding force and the amount of wear of the support yoke, and also fails to provide sufficient boundary lubrication required for the rack and pinion gear, resulting in the occurrence of wear of the support yoke and the rack and pinion gear, reduced steering performance, and abnormal noise generated from the rack bar.

As described above, a grease composition for lubrication between a metal member and a resin member was ineffective when used to lubricate between metal members, whereas a grease composition for lubrication between metal members was ineffective when used to lubricate between a metal member and a resin member.

Under these circumstance, the present invention has an object to provide a grease composition usable in common to lubrication between a metal member and a resin member and lubrication between metal members.

Means for Solution of the Problems

Surprisingly, the present inventors have found that it is possible to obtain a grease composition capable of lubrication both between metal members and between a metal member and a resin member by selecting a type of thickener, selecting a type and kinetic viscosity of a base oil, selecting types of additives and the amount of additives added, and selecting the consistency. In sum, according to the present invention, the following grease composition and rack-and-pinion type steering device filled with the grease composition are provided.

1. A grease composition comprising:
   a urea-based thickener;
   a synthetic hydrocarbon oil and/or a mineral oil as a base oil, a kinematic viscosity of the base oil at 100° C. being 4 to 40 mm$^2$/s; and
   1 to 10% by mass of a montan wax, 1 to 5% by mass of a molybdenum-based extreme pressure agent, and 1 to 5% by mass of a sulfonate-based compound as additives, wherein
   the grease composition has a consistency of 310 to 430, and
   the grease composition is for use in lubrication between a metal member and a metal member and lubrication between a metal member and a resin member.

2. The grease composition according to the above 1, wherein the thickener is an aliphatic diurea compound.
3. The grease composition according to the above 1 or 2, wherein the base oil is a synthetic hydrocarbon oil.
4. The grease composition according to any of the above 1 to 3, wherein the kinematic viscosity of the base oil at 100° C. is 4 to 10 mm²/s.
5. The grease composition according to any one of the above 1 to 4, wherein a content of the montan wax is 2 to 5% by mass.
6. The grease composition according to any one of the above 1 to 5, wherein the molybdenum-based extreme pressure agent is organomolybdenum and is contained at a content of 1 to 3% by mass.
7. The grease composition according to any one of the above 1 to 6, wherein the sulfonate-based compound is a neutral Ca sulfonate, and is contained at a content of 0.5 to 2% by mass.
8. The grease composition according to any one of the above 1 to 7, wherein the consistency is 355 to 385.
9. A rack-and-pinion type steering device filled with the grease composition according to any one of the above 1 to 8.
10. The rack-and-pinion type steering device according to the above 9, wherein a yoke pad of a support yoke included in the steering device is made of polyamide or PTFE.

Advantageous Effects of Invention

According to the present invention, it is possible to provide a grease composition usable between metal members and between a metal member and a resin member. According to the present invention, it is possible to improve a load bearing capacity of a rack and pinion gear and further improve the durability of the rack and pinion gear by reducing the frictional force and wear of the yoke pad and the rack bar.

DESCRIPTION OF EMBODIMENTS

[Urea-Based Thickener]

As a urea-based thickener of the present invention, a diurea-based thickener represented by Formula (1) presented below is preferable.

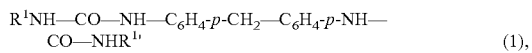

(where $R^1$ and $R^{1'}$ are each independently an octyl group, a dodecyl group, a hexadecyl group, an octadecyl group, or a cyclohexyl group).

As the diurea-based thickener in Formula (1), there are an aliphatic diurea in which both of $R^1$ and $R^{1'}$ are octyl groups, dodecyl groups, hexadecyl groups, octadecyl groups, or cyclohexyl groups, an alicyclic aliphatic diurea including a diurea compound in which one of $R^1$ and $R^{1'}$ is an octyl group, a dodecyl group, a hexadecyl group, or an octadecyl group and the other is a cyclohexyl group, and an alicyclic diurea in which both of $R^1$ and $R^{1'}$ are cyclohexyl groups.

As the urea-based thickener of the present invention, an aliphatic diurea compound is preferable, a diurea compound in which $R^1$ and $R^{1'}$ in Formula (1) are each independently an octyl group, a dodecyl group, a hexadecyl group, or an octadecyl group is more preferable, and an aliphatic diurea compound in which one of $R^1$ and $R^{1'}$ is an octyl group and the other is an octadecyl group is more preferable.

The content of the urea-based thickener may be any amount as long as the consistency of the grease can be adjusted to 310 to 430, and the specific content of the urea-based thickener based on the total mass of the composition is preferably 2 to 15% by mass, more preferably 3 to 10% by mass, and further preferably 3 to 7% by mass.

In the present specification, "% by mass" is based on the total mass of the composition.

[Base Oil]

A base oil in the present specification is a synthetic hydrocarbon oil and/or a mineral oil having a kinematic viscosity at 100° C. of 4 to 40 mm²/s. Use of such a base oil makes it possible to maintain good flowability of the grease between the rack bar and the yoke pad and to form an oil film sufficient for lubricating the support yoke and the rack bar.

The kinetic viscosity at 100° C. of the base oil is preferably 4 to 10 mm²/s.

As the synthetic hydrocarbon oil, poly-α-olefin is preferred. The synthetic hydrocarbon oil may be a so-called biomass, which is produced from biological resources derived from animals and plants. For example, a biomass hydrocarbon oil using a plant oil such as a palm oil, a corn oil, or a soybean oil may be also used.

As the mineral oil, a naphthenic oil or paraffin oil may be used. In order to improve the low-temperature flowability of the grease, the base oil preferably contains a synthetic hydrocarbon oil, and more preferably contains poly-α-olefin.

The base oil preferably contains a synthetic hydrocarbon oil having a kinetic viscosity at 100° C. of 4 to 10 mm²/s, and more preferably contains poly-α-olefin having a kinetic viscosity at 100° C. of 6 to 10 mm²/s.

The content of the base oil based on the total mass of the composition is preferably 75 to 95% by mass and more preferably 80 to 90% by mass from the viewpoint of lubricity.

[Additives]

The grease composition of the present invention contains, as additives, 1 to 10% by mass of a montan wax, 1 to 5% by mass of a molybdenum-based extreme pressure agent, and 1 to 5% by mass of a sulfonate-based compound.

In the present invention, the montan wax refers to a wax based on montanic acid obtained by purifying and oxidizing lignite and is a substance being insoluble in the base oil and having a dropping point of about 90° C. or higher as measured in accordance with ASTM D 127. As the montan wax usable in the present invention, there are acid waxes with an acid value of 110 to 160 mg KOH/g, ester waxes having both non-polar and polar moieties, esters of montanic acid, partially saponified ester waxes with a saponification value of 100 to 130 mg KOH/g, sodium or calcium salts of these, and so on. As the montan wax used in the present invention, a partially saponified montanic acid ester wax, particularly a partially saponified montanic acid ester wax having an acid value of 5 to 15 mg KOH/g and a saponification value of 100 to 130 mg KOH/g is preferred. The acid value is measured in accordance with ASTM D 1386. The saponification value is measured in accordance with ASTM D 1387. In the present invention, the montan wax mainly functions as a friction modifier and also functions as an extreme pressure agent when used in combination with a molybdenum-based extreme pressure agent and a sulfonate-based compound. In the present invention, when the content of the montan wax is 1 to 10% by mass, it is possible to favorably maintain the low friction properties and wear resistance of the rack bar and the yoke pad, and the wear resistance of the rack and pinion gear section. The content of the montan wax is preferably 2 to 5% by mass.

In the present invention, the molybdenum-based extreme pressure agent exhibits the wear resistance. As the molybdenum-based extreme pressure agent usable in the present invention, there is organomolybdenum, an example of which is oil-soluble or oil-insoluble molybdenum dithiocarbamate, preferably molybdenum dialkyldithiophosphate, particularly preferably molybdenum dibutyldithiocarbamate, or the like. In the present invention, when the content of the molybdenum-based extreme pressure agent is 1 to 5% by mass, it is possible to favorably maintain the wear resistance of the rack bar, the yoke pad, and the rack and pinion gear section. The content of the molybdenum-based extreme pressure agent is preferably 2% by mass. The grease composition preferably contains 1 to 3% by mass of organomolybdenum. The grease composition particularly preferably contains 1 to 3% by mass of molybdenum dibutyldithiocarbamate.

The sulfonate-based compound is generally used as a metal-based detergent-dispersant or a corrosion inhibitor for use in a lubricant oil such as an engine oil. In the present invention, the sulfonate-based compound functions to improve the extreme pressure properties. As the sulfonate-based compound usable in the present invention, there are Ca sulfonates, Ba sulfonates, Na sulfonates, and so on. Among these, a Ca sulfonate is preferred. The grease composition may contain an overbased sulfonate (for example, having a base number of 375 mg KOH/g or more as measured in accordance with JIS K 2501), but more preferably contains a neutral Ca sulfonate. Among the neutral Ca sulfonates, a calcium dinonylnaphthalene sulfonate is preferred. In the present invention, when the content of the sulfonate-based compound is 1 to 5% by mass, it is possible to favorably maintain the wear resistance of the rack bar, the yoke pad, and the rack and pinion gear section. The content of the sulfonate-based compound is preferably 0.5 to 2% by mass. The grease composition more preferably contains 0.5 to 2% by mass of a neutral Ca sulfonate. The grease composition particularly preferably contains 0.5 to 2% by mass of the calcium dinonylnaphthalene sulfonate.

As the additives in the present invention, the grease composition particularly preferably contains 2 to 5% by mass of partially saponified montanic acid ester wax, 2% by mass of molybdenum dibutyldithiocarbamate, and 1% by mass of calcium dinonylnaphthalene sulfonate.

The grease composition in the present invention may contain additives other the above three components. Examples of such additives include an antioxidant, a corrosion inhibitor, a metal corrosion inhibitor, an oiliness agent, an anti-wear agent, a solid lubricant, and so on. The content of these other additives is usually 0.1 to 5% by mass and preferably 0.5 to 3% by mass.

[Members to be Lubricated]

Although the grease composition for use in lubrication between metal members and the grease composition for use in lubrication between a metal member and a resin member are usually based on different formulations, the grease composition of the present invention can be used in lubrication between metal members and between a metal member and a resin member. Therefore, the grease composition of the present invention can be used in both locations within a single device or equipment where metal members slide against each other and where a metal member slides against a resin member. The lubrication between metal members includes lubrication between steel and steel, for example, lubrication in the rack and pinion gear (i.e., between the rack bar and the pinion), while the lubrication between a metal member and a resin member includes lubrication between steel and resin, for example, lubrication between the rack bar and the support yoke. Therefore, a rack-and-pinion type steering device is an example of a device in which a steel-steel lubrication point and a steel-resin lubrication point coexist. A resin for constituting the yoke pad of the support yoke is not particularly limited, but the yoke pad is preferably made of polyamide or PTFE, and more preferably polyamide from the viewpoints of sliding properties, durability, and environmental resistance.

[Consistency]

The consistency of the grease composition of the present invention is 310 to 430. When the consistency is within the above range, it is possible to maintain the flowability of the grease for improving the low friction properties and wear resistance of the rack bar and the yoke pad and the wear resistance of the rack and pinion gear section. The consistency of the grease composition of the present invention is preferably 355 to 385. The grease composition of the present invention can be applied simultaneously both between metal members and between metal and resin members, but can be also used only between metal members or only between metal and resin members. For example, the consistency for use for the rack and pinion gear is preferably about 310 to 415 for leakage prevention, whereas the consistency for use in lubrication of the rack bar and the support yoke is preferably about 340 to 430 for maintaining the flowability into an area to be lubricated.

As the grease composition of the present invention, particularly preferred is a grease composition for use in lubrication between a metal member and a metal member and lubrication between a metal member and a resin member, the grease composition comprising:

an aliphatic diurea thickener in which one of $R^1$ and $R^{1'}$ in above Formula (1) is an octyl group and the other is an octadecyl group, particularly an aliphatic diurea thickener in which the molar ratio of octyl groups to octadecyl groups is 1:1;

poly-α-olefin as a base oil, a kinetic viscosity of the base oil at 100° C. being 6 to 10 mm$^2$/s; and 2 to 5% by mass of a partially saponified montanic acid ester wax having an acid value of 5 to 15 mg KOH/g and a saponification value of 100 to 130 mg KOH/g, 1 to 3% by mass of a molybdenum dibutyldithiocarbamate, and 0.5 to 2% by mass of a calcium dinonylnaphthalene sulfonate as additives, wherein a consistency of the grease composition is 355 to 385.

Further, the grease composition of the present invention is particularly preferably a grease composition for a rack-and-pinion type steering device. The yoke pad of the support yoke included in the above steering device is preferably made of polyamide or PTFE.

EXAMPLES

<Preparation of Grease Compositions>

Using the components specified below, grease compositions in Examples and Comparative Examples were prepared. Specifically, a base grease was obtained by reacting 1 mole of 4',4-diphenylmethane diisocyanate with 2 moles of amine (the molar ratio of octylamine:octadecylamine=1:1) in a base oil with a kinematic viscosity at 100° C. of 8 mm$^2$/s, heating and cooling the reaction solution, and then kneading the resultant solution in a three-roll mill. The additives specified in Table 1 were then blended in the base grease, and the base oil was further added such that the amount of the thickener at the ratio specified in Table 2 was obtained. Then, the resultant mixture was dispersed using a three-roll mill to obtain the grease compositions in Examples and Comparative Examples. In addition to the additives specified in Table 1, each of the grease compositions contained 0.5% by mass of a reaction product of N-phenylbenzenamine and 2,4,4-trimethylpentene as an antioxidant and contained 0.05% by mass of 1-[N,N-bis(2-ethylhexyl)aminomethyl]-4-methylbenzotriazole and 0.05% by mass of 1-[N,N-bis(2-ethylhexyl)aminomethyl]-5-methylbenzotriazole as corrosion inhibitors.

The kinematic viscosity of the base oil was measured in accordance with JIS K 2283. The consistency refers to a 60-stoke worked penetration and was measured in accordance with JIS K2220 7.

Sliding Force Evaluation Criteria (Sliding Force Equivalent to Comparative Example 6 was Set as the Standard)
⊚: The sliding force was much lower than the standard
○: The sliding force was lower than the standard
Δ: The sliding force was equivalent to the standard
×: The sliding force was higher than the standard Durability Evaluation Criteria (Wear Equivalent to Comparative Example 6 was Set as the Standard)
⊚: The wear was much less than the standard
○: The wear was less than the standard
Δ: The wear was equivalent to the standard
×: The wear was more than the standard The grease composition in Example 6 was also subjected to the reciprocating motion test using a yoke pad made of PTFE. The results of both the sliding force and the durability were ⊚. The grease compositions in Comparative Examples 7 and 8 were subjected to the reciprocating motion test using yoke pads made of PTFE instead of the yoke pad made of polyamide.

TABLE 1

| Type | Substance Name | Trade Name | Remarks |
|---|---|---|---|
| Montan Wax | Partially saponified montanic acid ester wax (montan wax, calcium salt of montanic acid) | LICOWAX OP FLAKES | Acid Value (mg KOH/g) 9-14 Saponification Value (mg KOH/g) 102-122 |
| Polyethylene Wax | Polyethylene | LICOWAX PE190 POWDER | Average Molecular Weight: 17500 |
| Oxidized Polyethylene Wax | Ethylene oxide-propylene copolymer | LICOWAX PED522 | Average Molecular Weight: 3100 |
| Organomolybdenum | Molybdenum dibutyldithiocarbamate | KYA-10295 | |
| Neutral Ca Sulfonate | Calcium dinonylnaphthalene sulfonate | NA-SUL 729 | |
| Overbased Ca Sulfonate | Calcium sulfonate | LUBRIZOL 5283C | Base Number (mg KOH/g) 375 |
| Antioxidant | Reaction product of N-phenylbenzenamine and 2.4.4-trimethylpentene | IRGANOX L-57 | |
| Corrosion Inhibitor | 1-[N,N-bis(2-ethylhexyl)aminomethyl]-4-methylbenzotriazole | VERZONE OA-386 | |
| | 1-[N,N-bis(2-ethylhexyl)aminomethyl]-5-methylbenzotriazole | VERZONE OA-386 | |

The grease compositions prepared as described above were subjected to the following tests. Table 2 shows the results.

<Metal-Resin Sliding Force Evaluation and Durability Evaluation by Reciprocating Motion Test>

Test Conditions
  Load: 3000 N
  Speed: 62.5 mm/sec
  Stroke: 150 mm
  Number of cycles in endurance test: 20,000 cycles
  Atmosphere temperature: Room temperature <Metal-Metal Durability Evaluation Using High-Speed Four-Ball Load-Bearing Performance Test>

Weld point (W.P.) was measured in accordance with ASTM D 2596-97.

Test Conditions
  Number of revolutions: 1770 rpm
  Test period: 10 seconds

TABLE 2

| | Item | | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Thickener | Aliphatic Diurea | Mass % | 5.5 | 7 | 6 | | | 5.5 | | |
| Base Oil | Poly-α-Olefin | Mass % | | | | Balance | | | | |
| Additive | Montan Wax | Mass % | 2 | 3 | | | 4 | | | 5 |
| | Polyethylene Wax | Mass % | 0 | 0 | 0 | 0 | 0 | 0 | 0 | 0 |
| | Oxidized Polyethylene Wax | Mass % | 0 | 0 | 0 | 0 | 0 | 0 | 0 | 0 |
| | Organomolybdenum | Mass % | | | | | 2 | | | |
| | Neutral Ca Sulfonate | Mass % | | | | | 1 | | | |
| | Overbased Ca Sulfonate | Mass % | | | | | 0 | | | |

TABLE 2-continued

|  |  |  |  |  |  |  |  |  |  |  |
|---|---|---|---|---|---|---|---|---|---|---|
| | Consistency | | 370 | 370 | 325 | 350 | 360 | 370 | 385 | 370 |
| | Yoke Pad Material | | Poly Amide | Poly Amide | Poly Amide | Poly Amide | Poly Amide | Poly Amide | PTFE | Poly Amide | Poly Amide |
| Reciprocating Motion Test | Sliding Force | N | ◎ | ◎ | ○ | ○ | ◎ | ◎ | ◎ | ◎ | ◎ |
| | Durability (Wear Amount (Height Change Amount)) | mm | ◎ | ◎ | ○ | ○ | ◎ | ◎ | ◎ | ◎ | ◎ |
| High-Speed Four-Ball Load-Bearing Performance | Durability (High-Speed Four-Ball Load-Bearing Performance Test) W.P. | N | 2452 | 2452 | 2452 | 2452 | 2452 | 2452 | 2452 | 2452 | 2452 |

| Item | | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|
| Thickener | Aliphatic Diurea | Mass % | | | 5.5 | | | 8 | 5.5 | |
| Base Oil | Poly-α-Olefin | Mass % | | | | | Balance | | | |
| Additive | Montan Wax | Mass % | 4 | 0 | 0 | 4 | 4 | 4 | 0 | 0 |
| | Polyethylene Wax | Mass % | 0 | 0 | 0 | 0 | 0 | 0 | 4 | 0 |
| | Oxidized Polyethylene Wax | Mass % | 0 | 0 | 0 | 0 | 0 | 0 | 0 | 4 |
| | Organomolybdenum | Mass % | 0 | 2 | 2 | 2 | 0 | 2 | 2 | 2 |
| | Neutral Ca Sulfonate | Mass % | 0 | 1 | 0 | 0 | 1 | 1 | 1 | 1 |
| | Overbased Ca Sulfonate | Mass % | 0 | 0 | 1 | 0 | 0 | 0 | 0 | 0 |
| | Consistency | | 370 | 370 | 370 | 370 | 370 | 280 | 370 | 370 |
| | Yoke Pad Material | | Poly Amide | Poly Amide | Poly Amide | Poly Amide | Poly Amide | Poly Amide | PTFE | PTFE |
| Reciprocating Motion Test | Sliding Force | N | ◎ | X | X | ◎ | ◎ | Δ | X | X |
| | Durability (Wear Amount (Height Change Amount)) | mm | ◎ | X | X | ◎ | ◎ | Δ | X | X |
| High-Speed Four-Ball Load-Bearing Performance | Durability (High-Speed Four-Ball Load-Bearing Performance Test) W.P. | N | 681 | 1961 | 1961 | 1961 | 784 | 2452 | 1961 | 1961 |

Examples 1 to 8 all achieved ○ or above in the durability test and had good results in the high-speed four-ball load-bearing performance, whereas Comparative Examples 1 to 8 each achieved Δ, x, or ⊚ in the durability test but had poor results in the high-speed four-ball load-bearing performance.

What is claimed is:

1. A grease composition comprising:
   a urea-based thickener;
   a member selected from the group consisting of a synthetic hydrocarbon oil, a mineral oil, and a combination thereof as a base oil, a kinematic viscosity of the base oil at 100° C. being 4 to 40 mm²/s; and
   2 to 5% by mass of a partially saponified montanic acid ester wax having an acid value of 5 to 15 mg KOH/g, 1 to 5% by mass of a molybdenum-based extreme pressure agent, 1 to 5% by mass of a neutral calcium sulfonate as additives, and a reaction product of N-phenylbenzenamine and 2,4,4-trimethylpentene as an antioxidant, wherein
   the grease composition has a consistency of 310 to 430,
   the grease composition is for use in lubrication between a metal member and a metal member or lubrication between a metal member and a resin member, and
   the grease composition is free of polyethylene wax.

2. The grease composition according to claim 1, wherein the thickener is an aliphatic diurea compound.

3. The grease composition according to claim 1, wherein the base oil is a synthetic hydrocarbon oil.

4. The grease composition according to claim 1, wherein the kinematic viscosity of the base oil at 100° C. is 4 to 10 mm²/s.

5. The grease composition according to claim 1, wherein the molybdenum-based extreme pressure agent is organomolybdenum and is contained at a content of 1 to 3% by mass.

6. The grease composition according to claim 1, wherein the neutral Ca sulfonate is contained at a content of 0.5 to 2% by mass.

7. The grease composition according to claim 1, wherein the consistency is 355 to 385.

8. A rack-and-pinion type steering device filled with the grease composition according to claim 1.

9. The rack-and-pinion type steering device according to claim 8, wherein a yoke pad of a support yoke included in the steering device is made of polyamide or PTFE.

10. The grease composition according to claim 1, wherein the content of the urea-based thickener is 2 to 15 mass % based on the total mass of the grease composition.

11. The grease composition according to claim 1, wherein the content of the base oil is 75 to 90 mass % based on the total mass of the grease composition.

12. The grease composition according to claim 1, wherein the thickener is an aliphatic diurea compound represented by formula (1):

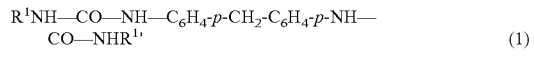

$$R^1NH-CO-NH-C_6H_4\text{-}p\text{-}CH_2\text{-}C_6H_4\text{-}p\text{-}NH-CO-NHR^{1\prime} \quad (1)$$

wherein one of $R^1$ and $R^{1'}$ is an octyl group and the other is an octadecyl group in which a molar ratio of octyl groups to octadecyl groups is 1:1.

* * * * *